United States Patent
Balogh et al.

(10) Patent No.: US 9,296,375 B2
(45) Date of Patent: Mar. 29, 2016

(54) BRAKE SYSTEM AND VEHICLE INCLUDING THE BRAKE SYSTEM

(75) Inventors: Levente Balogh, Szigetszentmiklos (HU); Michael Herges, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 1458 days.

(21) Appl. No.: 12/735,551

(22) PCT Filed: Jan. 30, 2009

(86) PCT No.: PCT/EP2009/000608
§ 371 (c)(1),
(2), (4) Date: May 26, 2011

(87) PCT Pub. No.: WO2009/098004
PCT Pub. Date: Aug. 13, 2009

(65) Prior Publication Data
US 2011/0266100 A1 Nov. 3, 2011

(30) Foreign Application Priority Data
Feb. 4, 2008 (DE) .......................... 10 2008 007 709

(51) Int. Cl.
B60T 13/00 (2006.01)
B60T 13/38 (2006.01)
B60T 17/08 (2006.01)

(52) U.S. Cl.
CPC ............. B60T 13/385 (2013.01); B60T 17/083 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,586,584 A | * | 5/1986 | Auman et al. | 180/271 |
| 4,673,222 A | * | 6/1987 | Knight | 303/9 |
| 5,042,883 A | * | 8/1991 | McCann et al. | 303/7 |
| 6,449,551 B1 | * | 9/2002 | Wrede | 701/70 |
| 8,152,243 B2 | * | 4/2012 | Bensch et al. | 303/7 |
| 2004/0012249 A1 | * | 1/2004 | Koelzer | 303/3 |
| 2005/0127743 A1 | * | 6/2005 | Pontello et al. | 303/3 |

FOREIGN PATENT DOCUMENTS

| | | |
|---|---|---|
| DE | 196 48 174 | 5/1998 |
| EP | 1 800 916 | 6/2007 |
| WO | 03/042020 | 5/2003 |

OTHER PUBLICATIONS

European Patent Office, International Preliminary Report on Patentability and Written Opinion, Aug. 19, 2010, from International Patent Application No. PCT/EP2009/000608, filed on Jan. 30, 2009.
European Patent Office, Translation of International Preliminary Report on Patentability and Written Opinion, Sep. 16, 2010, from International Patent Application No. PCT/EP2009/000608, filed on Jan. 30, 2009.

* cited by examiner

*Primary Examiner* — Christopher Schwartz
(74) *Attorney, Agent, or Firm* — Kenyon & Kenyon LLP (57) ABSTRACT

A brake system for a vehicle, in particular for a utility vehicle, having at least one wheel brake device on each of at least one front axle and at least one rear axle, the device including a service brake actuator and a spring-type brake actuator, it being possible to actuate the wheel brake device by a service brake actuation device and a parking brake actuation device. Also described is a vehicle having such a brake system.

29 Claims, 7 Drawing Sheets

Fig. 7

BRAKE SYSTEM AND VEHICLE INCLUDING THE BRAKE SYSTEM

FIELD OF THE INVENTION

The present invention relates to a brake system for a vehicle, in particular for a utility vehicle, having at least one wheel brake device on each of at least one front axle and at least one rear axle, the device comprising a service brake actuator and a spring-type brake actuator, it being possible to actuate the wheel brake device by a service brake actuation device and a parking brake actuation device. The present invention further relates to a vehicle having such a brake system.

BACKGROUND INFORMATION

A service brake actuator applies the wheel brake device more and more as the pressure applied increases, whereas a spring-type brake actuator applies the wheel brake device with the same spring force without any application of pressure. Applying pressure to a spring-type brake actuator tensions its spring and therefore counteracts the application of the wheel brake device. Spring-type brake actuators are therefore used as parking brake, for example.

The parking brake on many of these vehicles is also used as auxiliary brake whilst underway, should the service brake or parts of the service brake fail.

Such utility vehicles have at least one front axle and at least one rear axle.

The service brake part of such brake systems is designed with at least two brake circuits, one service brake circuit usually being assigned to at least one front axle and the second circuit being assigned to at least one rear axle.

In many utility vehicles spring-type brake actuators are used on more than one axle, in order to allow an adequate braking function of the parking brake, especially in cases of auxiliary braking.

Many of these vehicle have an air suspension ride height adjustment for raising and lowering the entire vehicle. As a result the kinematic wheelbases may vary according to the geometry of the axle suspension.

One disadvantage of such a brake system is that when stationary with spring-type brake actuators engaged the wheels thus equipped are firmly locked to the axle, so that in the event of a ride height adjustment, for example, strains can occur in the stationary vehicle, since the wheelbases are fixed. All spring-type brake actuators cannot be released simultaneously, however, since unwanted vehicle movements might then occur.

SUMMARY OF THE INVENTION

In response to this, an object of the exemplary embodiments and/or exemplary methods of the present invention is to create a brake system and a vehicle provided with such a brake system, which will allow a ride height adjustment whilst at the same time preventing unwanted rolling away of the vehicle.

This object is achieved by a brake system having the features described herein and by a vehicle having such a brake system as also described herein.

The brake system according to the exemplary embodiments and/or exemplary methods of the present invention for a vehicle, in particular for a utility vehicle, has at least two wheel brake devices, which comprise a service brake actuator and a spring-type brake actuator, it being possible to actuate the wheel brake devices by at least one service brake actuation device and at least one parking brake actuation device.

According to the exemplary embodiments and/or exemplary methods of the present invention at least the spring-type actuator of a wheel brake device can be released by a control pressure generated by the service brake actuation device or another control pressure source, at least one further wheel brake device being actuated in order to immobilize the vehicle, the minimum of at least one further wheel brake device being applied by a still vented spring-type brake actuator and/or a pressurized service brake actuator.

In contrast to the state of the art, this means that with the parking brake engaged the wheel brake devices on individual axles of the vehicle can be released continuously or in stages, in order to prevent straining of the vehicle in the event of a riddle height adjustment without neutralizing the entire parking brake system. Release of the spring-type actuators may be initiated by a signal from the control unit for the air suspension ride height adjustment. In operational service the spring-type brake actuators are available at any time as auxiliary, emergency or additional brakes, so that the braking action and vehicle stability when braking are improved and are optimally adjustable. This substantially increases the road safety of the vehicle whist still allowing release of the spring-type brake actuators on defined axles during the ride height adjustment.

A foot brake valve, a relay valve or any other service brake valve and/or an electro-pneumatic modulator of an electronic brake system may serve as service brake actuation device.

A handbrake valve, a relay valve of the parking brake system or a pressure modulator of an electro-pneumatic parking brake may feasibly be used as parking brake actuation device.

At least one wheel brake device may be assigned to each of the front and rear wheels of the axles of the vehicle, the spring-type brake actuators of at least one of the axles being releasable independently of the spring-type brake actuators of at least one further axle of the vehicle.

At least one wheel brake device that is not to be released may be braked by the spring-type brake actuator.

In an alternative exemplary embodiment of the present invention the wheel brake device that is not to be released is braked by an actuation of the service brake actuators.

According to the exemplary embodiments and/or exemplary methods of the present invention a shuttle valve device is arranged between control pressure source, parking brake circuit and the spring-type brake actuators to be released, in such a way that the spring-type brake actuators to be released are subjected to the higher of the two pressures from the control pressure source and the parking brake circuit. The pneumatic control pressure, for example, allows the spring-type brake actuators of the axles that are to be released to be relieved partially or entirely as a function of the pressure of the control pressure source.

If no ride height adjustment is performed, the parking brake actuation device for actuating the spring-type brake actuators vents the parking brake circuit, whilst at the same time no pressure from the control pressure source is applied to the shuttle valve device.

Parts of the service brake system, for example a service brake actuation device, an ASR valve or an additional control valve specially installed for this purpose represent a possible control pressure source.

In order to prevent an unwanted addition to the application forces applied via the service brake actuators and the spring-type brake actuators, an overload protection relay valve, on which the pressure of a service brake circuit additionally acts and which already constitutes a shuttle valve device, may be arranged in the flow path between the parking brake actuation device and the spring-type brake actuators. The control pressure for releasing the spring-type brake actuators on at least one axle may then be applied by the service brake actuation device.

When pressure is applied by the service brake actuation devices without the activation of the ABS valves, all wheel brake devices of the vehicle are actuated by the service brake actuators.

If the parking brake is also applied, the spring-type brake actuators are released more or less proportionately as the service brake actuators build up the application force, so that overall the application force does not exceed a critical valve, but all wheels are braked.

In this case at least one ABS valve, which is located in the flow path between the service brake actuation device and the service brake actuators, is assigned to one of the service brake circuits.

During the ride height adjustment with simultaneous actuation of the service brake actuation device, for example through actuation of a foot brake pedal, at least one ABS valve is switched into the venting position. The spring-type brake actuators are therefore opened via the relay valve with overload protection function, whilst the service brake actuators not vented by at least one ABS valve prevent the vehicle from rolling away.

In another variant of the exemplary embodiments and/or exemplary methods of the present invention the control pressure for releasing the spring-type brake actuators of at least one axle is applied by at least one ASR valve. In brake systems with ASR pressure may be applied to the service brake actuators of at least one driven axle by energizing at least one ASR valve. This can be activated by a control signal from an electronic control unit (ECU).

For this purpose at least one ASR valve is connected to a first connection of a first shuttle valve device, the second connection of which is connected to the service brake actuation device and the third connection of which is connected directly or indirectly, for example via a relay valve for actuating at least one service brake actuator and a further shuttle valve device, for example a relay valve with overload protection function or a shuttle valve.

The further shuttle valve is also connected to the parking brake actuation device and directly or indirectly, for example via a relay, to the spring-type brake actuators to be released.

During the ride height adjustment at least one ASR valve is activated and applies pressure to the service brake actuators of the driving axle via the first shuttle valve device and to the spring-type brake actuators of at least one other axle via the second shuttle valve device.

As a result only the wheel brake devices of at least one driving axle are applied whilst the wheel brake devices of the other axles are released.

In a vehicle with an electronic brake system (EBS) and ABS valves the shuttle valve device may be connected to each pressure control module that can be isolated from the service brake actuators by an ABS valve. In this embodiment of the brake system according to the present invention the control pressure for releasing the spring-type brake actuators of at least one axle may be applied by a pressure control module of the electronic brake system (EBS).

The pressure control module may be connected to a first connection of a shuttle valve device, the second connection of which is connected directly or indirectly via a relay valve to the spring-type brake actuators to be released and the third connection of which is connected directly or via a relay valve to the parking brake actuation device for actuating the spring-type brake actuators. The pressure module is further connected via at least one ABS valve to at least one service brake actuator.

The pressure applied by the pressure control module can be isolated from at least one service brake actuator by at least one ABS valve.

During the ride height adjustment the pressure control module is activated and via the shuttle valve device applies pressure to the spring-type brake actuators to be released. At the same time at least one ABS valve is activated, so that at least one service brake actuator remains pressureless.

In the case of an electronic brake system without ABS valves the shuttle valve device may be connected to the pressure control module of the axle which is not to be released or which does not have any spring-type brake actuators.

A vehicle according to the exemplary embodiments and/or exemplary methods of the present invention uses a brake system having a wheel brake device, which comprises a service brake actuator and a spring-type brake actuator, it being possible to actuate the service brake actuator and the spring-type brake actuator by a service brake actuation device and a parking brake actuation device. The spring-type brake actuator of at least one wheel brake device can be released by a control pressure applied by the control pressure source, at least one further wheel brake device being actuated for immobilizing the vehicle.

Other advantageous developments of the exemplary embodiments and/or exemplary methods of the present invention form the subject of the further descriptions herein.

Exemplary embodiments of the present invention will be explained in more detail below with reference to schematic drawings.

DETAILED DESCRIPTION

Figure 1:
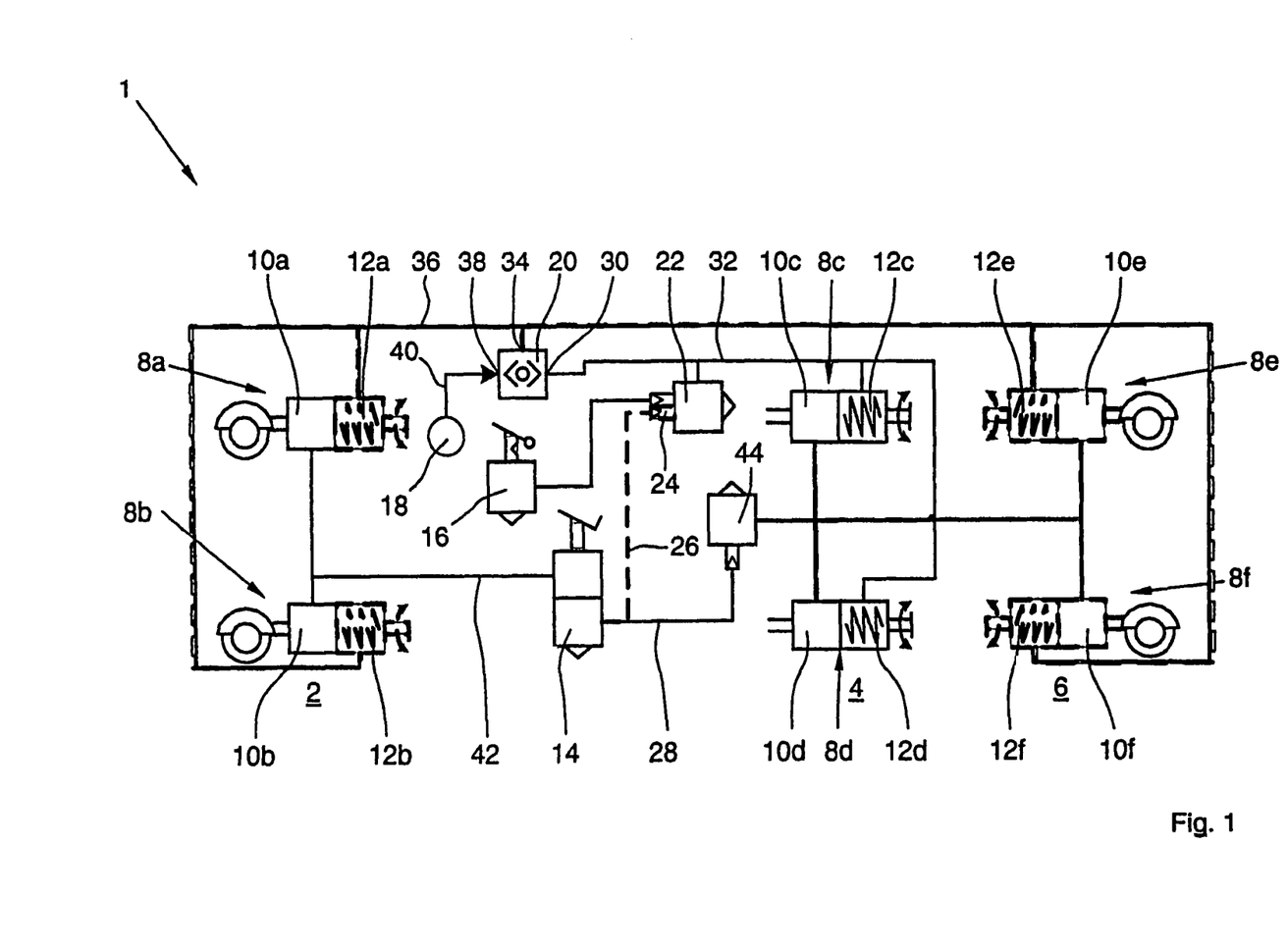
FIG. 1 shows a schematic circuit diagram of a brake system according to the present invention in a first exemplary embodiment of the present invention having an additional control pressure source.

FIG. 1 shows a schematic circuit diagram of a brake system 1 for a utility vehicle, for example a truck, in which a wheel brake device 8a to 8f, which comprises a service brake actuator 10a to 10f and a spring-type brake actuator 12a to 12f, is assigned to each of the front and rear wheels of the axles 2, 4, 6. The service brake actuators 10a to 10f can be actuated by a service brake actuation device 14 and the spring-type brake actuators 12a to 12f can be actuated by parking brake actuation device 16, for example a handbrake. The spring-type brake actuators of individual axles can be released by a control pressure independently of the spring-type brake actuators of other axles of the vehicle. In the exemplary embodiment shown the spring-type brake actuators 12a, 12b of the front axle 2 and the spring-type brake actuators 12e, 12f of the trailing rear axle 6 can be released by the control pressure independently of the spring-type brake actuators 12c, 12d of the forward rear axle 4 of the vehicle.

The spring-type brake actuators 12a, 12b; 12e, 12f on the front axle 2 and the trailing rear axle 6 are releasable continuously or in stages in order to prevent any strains on the vehicle, for example in the event of a ride height adjustment by a pneumatic suspension, or due to loading, without neutralizing the entire parking brake system. The spring-type brake actuators 12c, 12d remain activated, so that any unwanted vehicle movement is prevented. In operational service the spring-type brake actuators 12a to 12f are available at any time as auxiliary, emergency or additional brake through pressure relief afforded by the parking brake actuation device 16, so that the braking action and vehicle stability when braking are improved and optimally adjustable. This substantially increases the road safety of the vehicle whist still allowing release of the parking brake on defined axles.

According to FIG. 1 the control pressure (auxiliary pressure) is applied by a control pressure source 18 to the spring-type brake actuators 12a, 12b; 12e, 12f of the front axle 2 and the trailing rear axle 6 that are to be released. For this purpose a shuttle valve device 20 is arranged between the control pressure source 18 and the spring-type brake actuators 12a, 12b; 12e, 12f to be released, in such a way that the connection of the control pressure source 18 to the spring-type brake actuators 12, 12d of the forward rear axle 4 which are not to be released can be interrupted. For actuating the spring-type brake actuators 12a to 12f, for example in order to achieve a parking function, the parking brake actuation device 16 can be connected to the spring-type brake actuators 12a to 12f via the shuttle valve device 20 as a function of the control pressure from the control pressure source 18. In order to prevent an unwanted addition to the brake forces applied via the service brake actuation device 14 and the parking brake actuation device 16, an overload protection relay valve 22 is arranged in the flow path between the parking brake actuation device 16 and the shuttle valve device 20. A control connection 24 of the overload protection relay valve 22 is connected via a connecting line 26 to a pressure line 28 of the service brake actuation device 14.

For the auxiliary and parking brake the overload protection relay valve 22 acts as relay valve, being activated by the parking brake actuation device 16 and either ventilating the spring-type brake actuators 12a to 12f directly from a compressed air reservoir (not shown) or venting them via a bleed vent in proportion to the inlet control pressure. A first connection 30 of the shuttle valve device 20 is connected via a supply line 32 to the overload protection relay valve 22 and a second connection 34 is connected via a line 36 to the spring-type brake actuators 12a, 12b of the front axle that are to be released and the spring-type brake actuators 12e, 12f of the trailing rear axle 6 that are to be released. A control connection 38 of the shuttle valve device 20 is connected to the control pressure source 18 via a control line 40.

A pneumatic control pressure serves for partially or fully relieving the spring-type brake actuators 12a, 12b; 12e, 12f of the axles 2, 6 that are to be released, as a function of the pressure from the control pressure source 18. The percentage degree of release of the spring-type brake actuators 12a, 12b; 12e, 12f is determined by the higher of the two pressures from the control pressure source 18 and the parking brake circuit. The service brake actuation device 14 is connected via a pressure line 42 to the service brake actuators 10a, 10b of the front axle 2. A relay valve 44 for the rapid build-up or reduction of pressure in the rear axle brakes is arranged in the pressure line 28 intended for supplying the service brake actuators 10c to 10f of the rear axles 4, 6, between the service brake actuation device 14 and the service brake actuators 10c to 10f.

Figure 2:
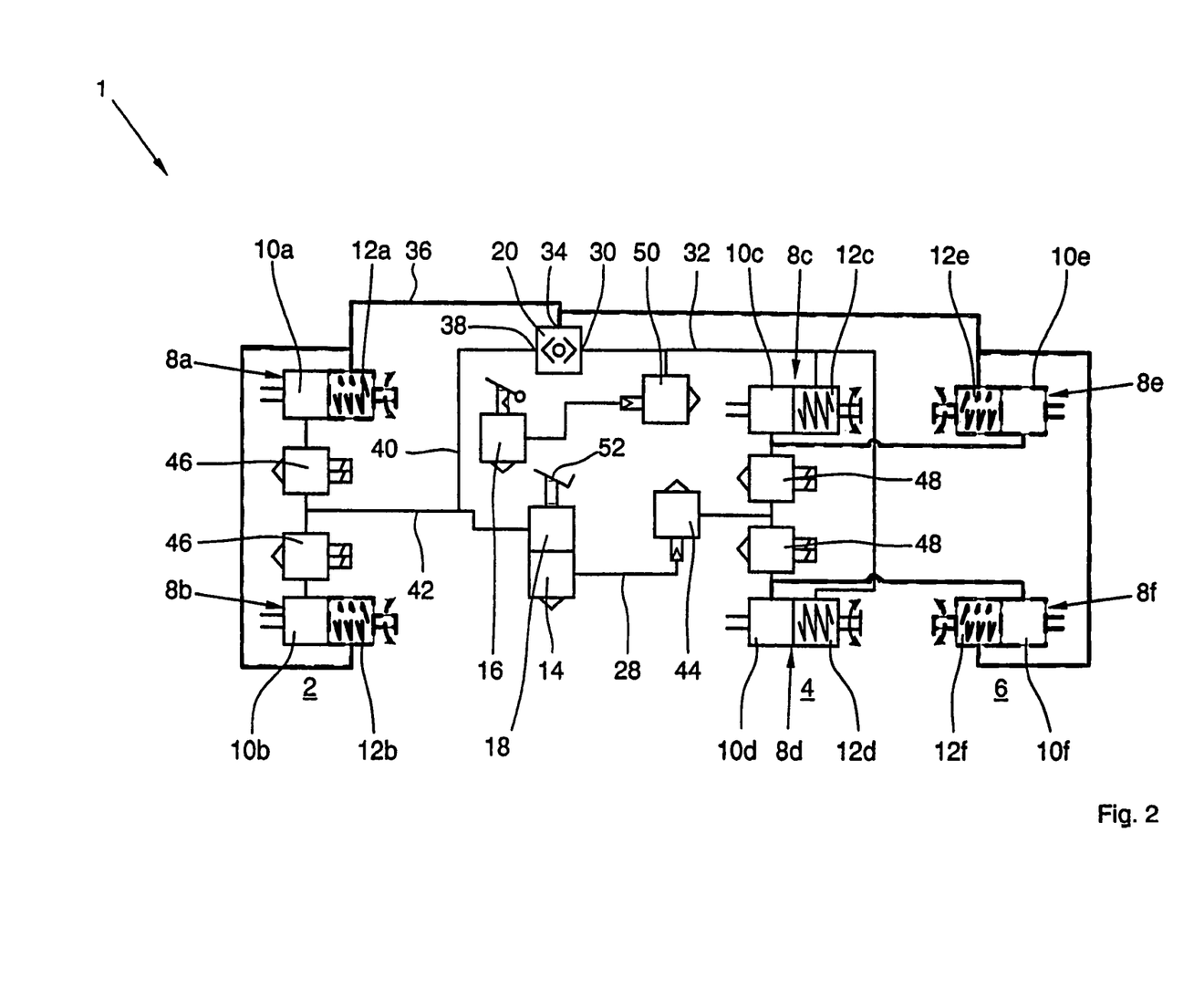
FIG. 2 shows a schematic circuit diagram of a brake system according to the present invention in a second exemplary embodiment of the present invention in which a control pressure is applied by the service brake actuation device.

As can be seen from FIG. 2, which shows a schematic circuit diagram of an alternative embodiment of a brake system 1 according to the present invention, in this variant the control pressure for releasing the spring-type brake actuators 12a, 12b of the front axle 2 and the spring-type brake actuators 12e, 12f of the trailing rear axle 6 is applied by the service brake actuation device 14. An ABS valve 46 is assigned to each of the spring-type brake actuators 12a, 12b of the front axle 2. The wheel brake devices 8 of the rear axles 4, 6 are laterally fitted with common ABS valves 48. The ABS valves 46 assigned to the front axle 2 are each located in the flow path between the service brake actuation device 14 and the service brake actuators 10a, 10b. The service brake actuation device 14 is connected via the pressure line 42 and the intermediate ABS valves 46 to the service brake actuators 10a, 10b of the front axle 2 and via the pressure line 28 and the intermediate relay valves 44 and the ABS valves 48 to the service brake actuators 10c to 10f of the two rear axles 4, 6.

The service brake device 14 is further connected via the control line 40 to the control connection 38 of the shuttle valve device 20. The shuttle valve device 20 can be set by the pressure applied by the service brake actuation device 14 to a working position in which the spring-type brake actuators 12a, 12b; 12e, 12f of the axles 2, 6 to be opened are released. In this variant the service brake pressure acting on the shuttle valve device 20 is capable of relieving the spring-type brake actuators 12a, 12b; 12e, 12f, whilst the ABS valves 46 serve to keep the service brake actuators 10 in a pressureless state, isolated from the service brake actuation device 14. The connection 30 of the shuttle valve device 20 is connected to the parking brake actuation device 16 via a relay valve 50. The control connection 38 is connected via the control line 40 to the service brake actuation device 14 and the connection 34 is connected to the spring-type brake actuators 12a, 12b; 12e, 12f to be released. Applying pressure by the service brake actuation device 14 without the activation of the ABS valves 46, 48 affords overload protection, particularly for the axles 2, 6 of the vehicle which are connected to the service brake actuation device 14 via the shuttle valve device 20.

In the case of an ABS system the additional shuttle valve device 20 is only necessary if the relay valve 50, as shown, does not have any overload protection. During the release of the spring-type brake actuators, and in actuation of the service brake actuation device 14, particularly by a footbrake pedal 52, the ABS valves 46, 48 are closed, so that no pressure reaches the service brake actuators 10a, 10b, 10c, 10d, 10e and if and the vehicle is therefore prevented from rolling away solely by the spring-type brake actuators 12c and 12f, whilst the other wheels can turn freely.

Figure 3:
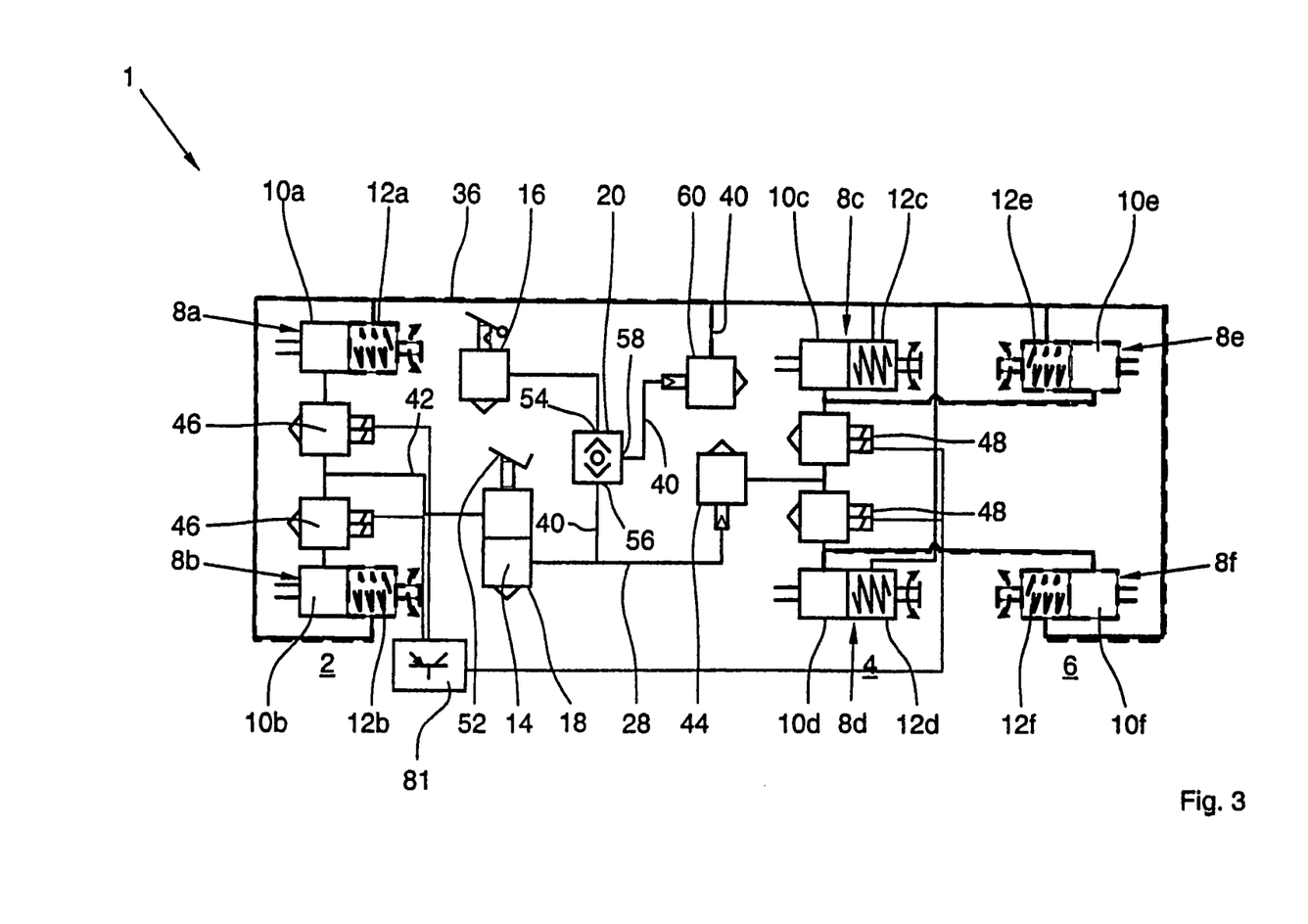
FIG. 3 shows a schematic circuit diagram of a variant of the brake system according to the present invention.

FIG. 3 shows a variant of a brake system 1, which differs from the embodiment represented in FIG. 2 mainly in that a connection 54 of the shuttle valve device, in this case a shuttle valve 20, is connected to the parking brake actuation device 16, a second connection 56 is connected to the service brake actuation device 14 and a third connection 58 is connected via a relay 60 to the spring-type brake actuators 12a to 12f. This brake system has the advantage that it affords overload protection for each of the axles 2, 4, 6, since the shuttle valve device 20 serves to prevent an addition to the application force of the wheel brake devices by simultaneously pressurized service brake actuators and pressureless spring-type brake actuators.

Should a ride height adjustment take place, actuation of the footbrake pedal 52 will cause the service brake actuation device 14 to modulate a control pressure, thereby releasing the spring-type brake actuators 12a to 12f via the shuttle valve device 58 and the relay valve 60. At the same time the ABS valves 48 of the rear axles 4, 6 are closed, so that that no pressure is applied to the service brake actuators 10d to 10f of the rear axles 4, 6. All wheels on the rear axles 4, 6 are therefore unbraked. The ABS valves 46 of the front axle 2 remain in the transmission position, so that the service brake actuators 10a, 10b of the wheel brake devices 8a, 8b of the front axle 2 are applied and prevent the vehicle from rolling away.

Figure 4:
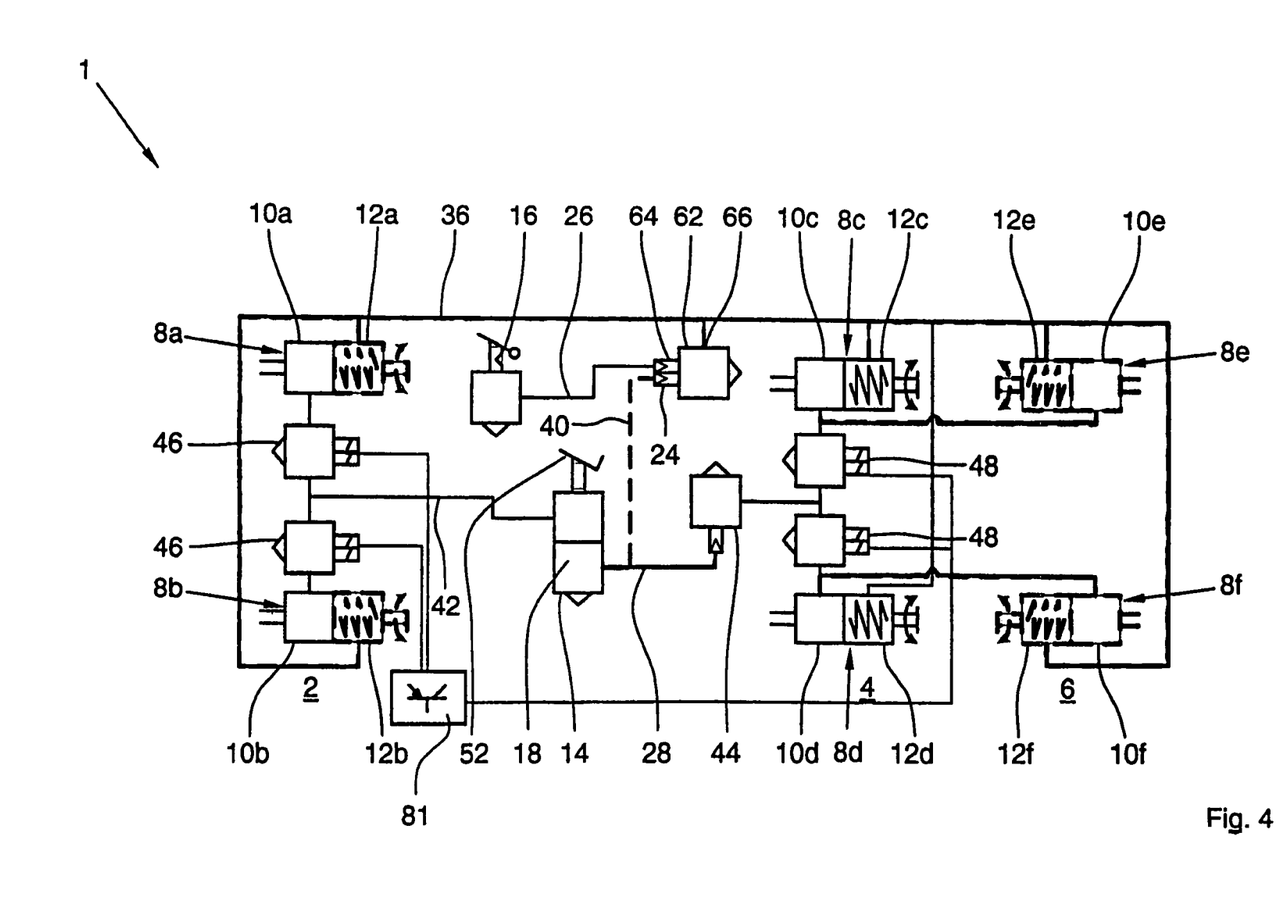
FIG. 4 shows a schematic circuit diagram of a brake system in an exemplary embodiment having ABS valves and an overload protection relay valve.

FIG. 4 shows an exemplary embodiment of the present invention, the working of which is identical to that in FIG. 3. The functions of the shuttle valve and the relay valve are merely combined in the overload protection relay valve unit 62, which therefore constitutes the shuttle valve device. The overload protection relay valve 62 comprises a connection 64 connected to the service brake actuation device 14 via the connecting line 26, a connection 64 connected to the parking brake actuation device 16 and a connection 66 connected to the spring-type brake actuators 12a to 12f via the line 36.

Figure 5:
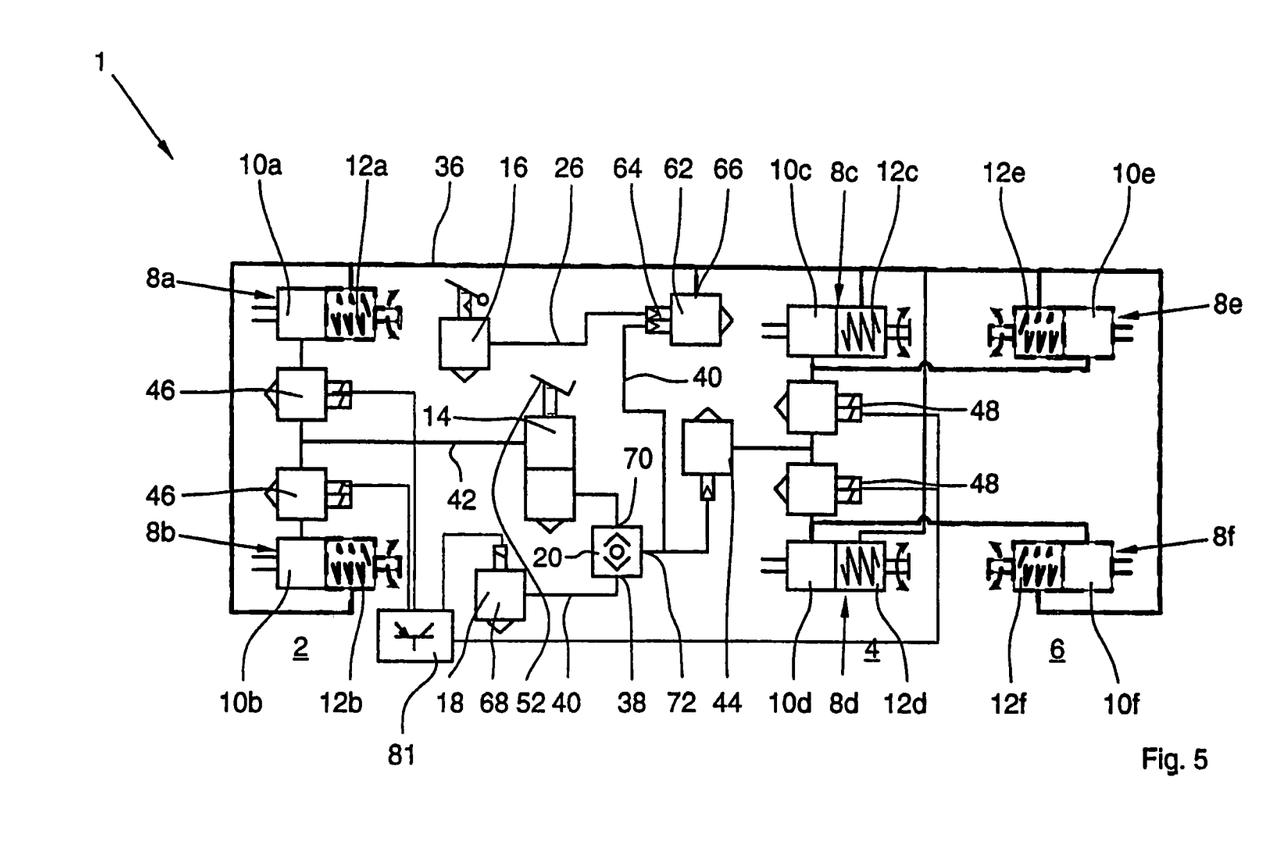
FIG. 5 shows a schematic circuit diagram of a brake system in which the spring-type brake actuators are released by an ASR valve.

According to FIG. 5 the manual actuation of the footbrake pedal 52 for applying the control pressure can be replaced by an ASR valve 68. The control pressure for releasing the spring-type brake actuators 12a to 12f. This valve can be activated by a control signal from an electronic control unit (ECU) for releasing the spring-type brake actuators 12a to 12f.

The ASR valve 68 is connected via the control line 40 to the control connection 38 of the shuttle valve device 20, the second connection 70 of which is connected to the service brake actuation device 14 and the third connection 72 of which is connected via the connecting line 26 to the overload protection relay valve 62 and via the pressure line to the relay valve 44 for actuating the service brakes 10c, 10d, 10e, 10f. If the ASR valve is activated, the spring-type brake actuators 12a to 12f are released by the overload protection relay valve 62 and the service brake actuators 10d to 10f are simultaneously applied, so that the vehicle is prevented from rolling away. The wheels of the front axle 2 can turn freely. On many vehicles this is sufficient to allow an adequately strain-free ride height adjustment.

Figure 6:
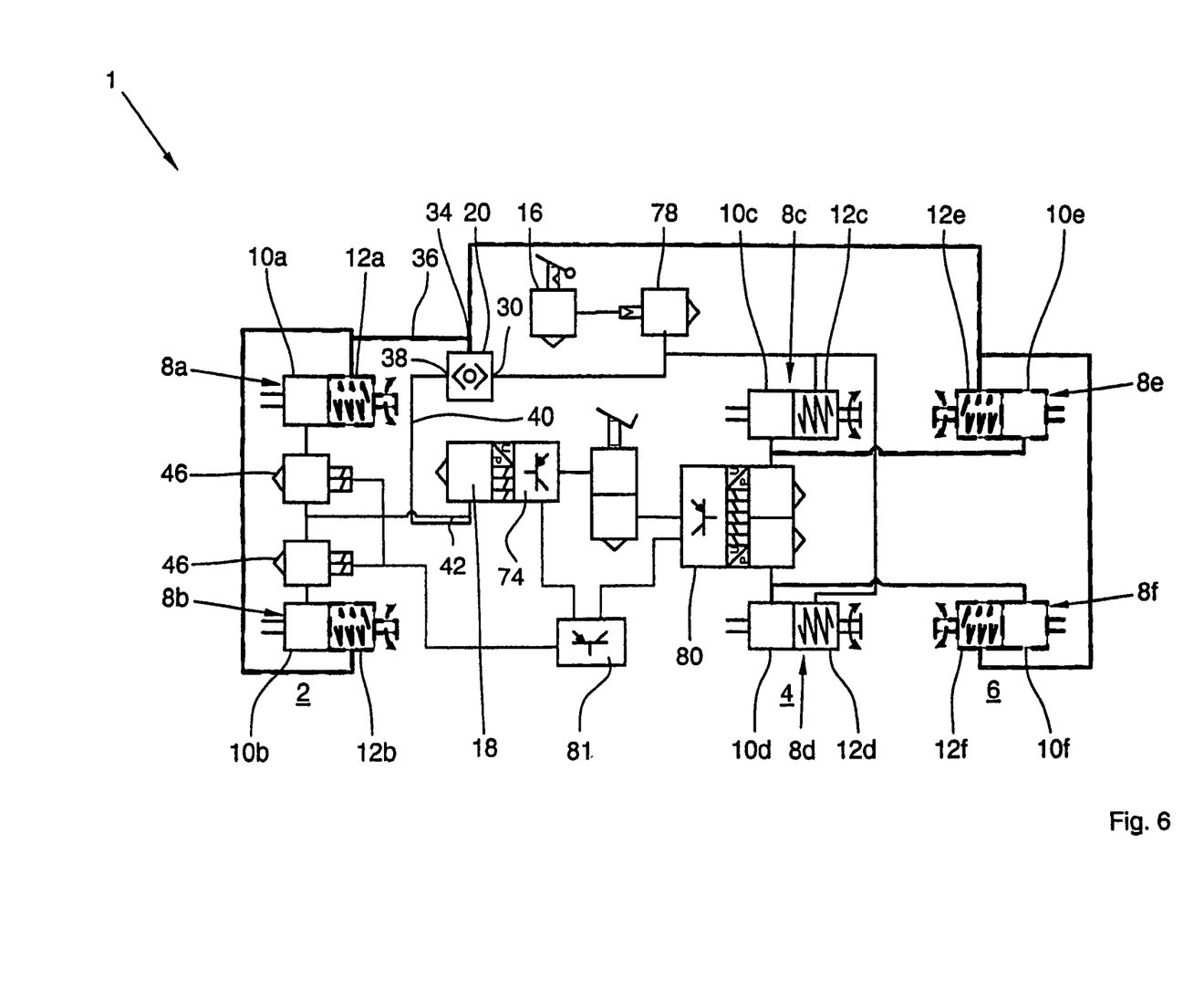
FIG. 6 shows a schematic circuit diagram of a brake system in which a control pressure for releasing the spring-type brake actuators is applied by a pressure control module.

In the case of a brake system 1 represented in FIG. 6 the control pressure for releasing the spring-type brake actuators 12a, 12b, 12e, 12f is applied by a pressure control module 74 of an electronic brake system (EBS). In an electronic brake system with ABS valves 46 the shuttle valve device 20 may be connected to any pressure control module 74 which can be isolated from the service brake actuators 10a, 10b by at least one ABS valve 46. According to FIG. 6 the pressure control module 74 is connected via the control line 40 to the control connection 38 of the shuttle valve device 20, the second connection 34 of which is connected to the spring-type brake actuators 12a, 12b, 12e, 12f to be released and the third connection 30 of which is connected via a relay valve 78 to the parking brake actuation device 16. The pressure control module 74 here forms the service brake actuation device. The ABS valves 46 are arranged between the pressure control module 74 and the front service brake actuators 10a, 10b. The pressure applied by the pressure control module 74 can be isolated from the service brake actuators 10a, 10b by the ABS valves 46. A further pressure control module 80 is assigned to the service brake actuators 10c, 10d, 10e, 10f for actuating the wheel brake devices of the rear axle brakes.

If the parking brake is applied during a ride height adjustment, the assigned electronic control unit 81 (ECU) causes the pressure control module 74 to modulate a pressure. As control pressure, this is transmitted via the control line 40, the shuttle valve device 20 and the lines 36 to the spring-type brake actuators 12a, 12b, 12e and 12f, so that the latter are released. At the same time the electronic control unit 81 closes the ABS valves 46 of the front axle 2 and therefore isolates the service brake actuators 10a, 10b from the modulated pressure of the pressure control module 74. In this case the vehicle is immobilized by the spring-type brake actuators 12c and 12d of the first rear axle 4.

Figure 7:
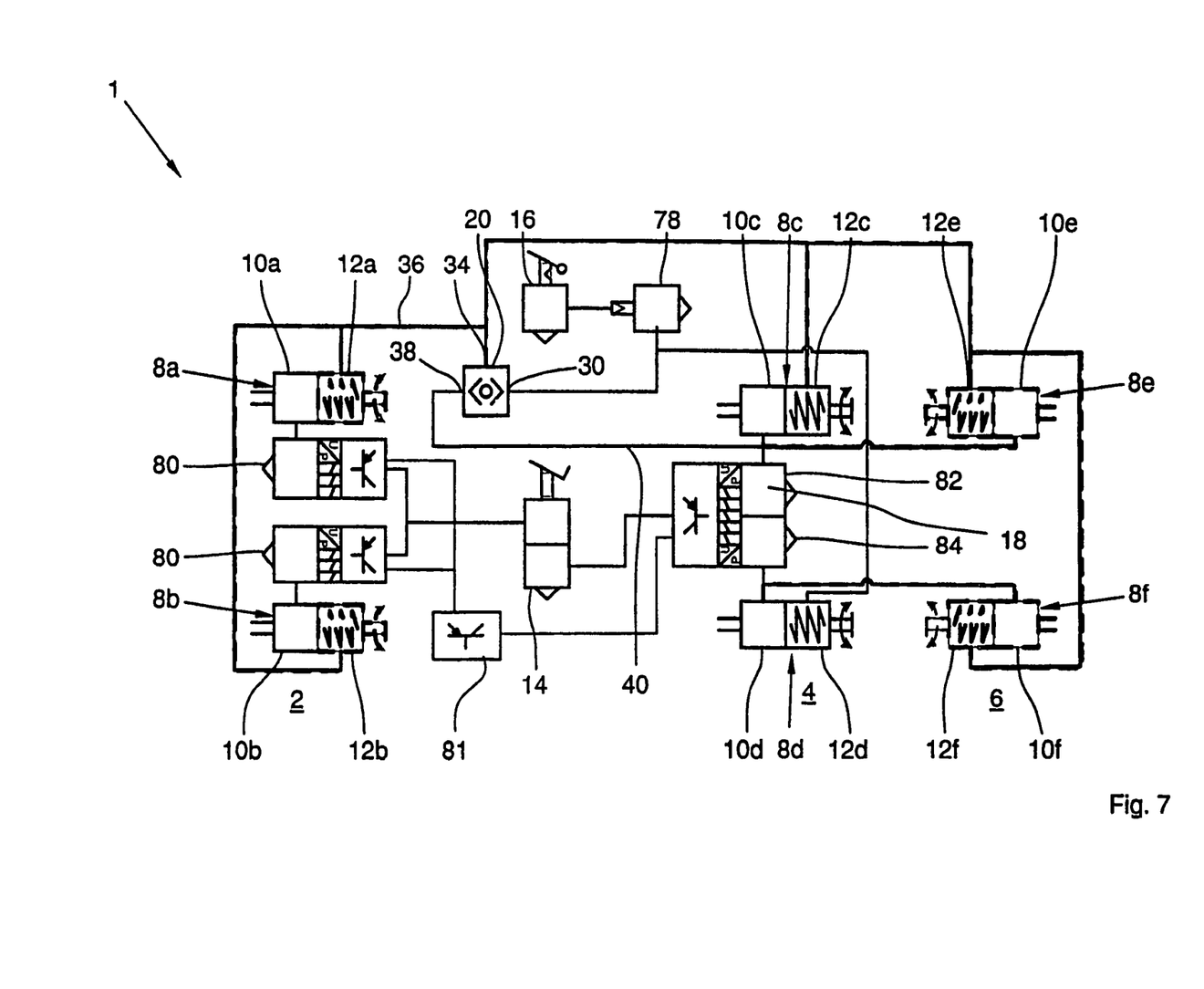
FIG. 7 shows a schematic circuit diagram of a brake system having an electronic brake system without ABS valves.

As can be seen from FIG. 7, which shows a brake system 1 comprising an electronic brake system without ABS valves, the shuttle valve device 20 in this variant is connected to a port of the pressure control module 82 of the axle which is not to be released, that is to say the forward rear axle 4. The control pressure for releasing the spring-type brake actuators 12a, 12b, 12e, 12f of the front axle 2 and the trailing rear axle 6 is applied by the pressure control module 82 of the electronic brake system assigned to the forward rear axle 4. Since the port of the pressure control module serving as control pressure source also applies the service brake actuator 10c of the associated wheel brake device 8c, the spring-type brake actuator 12c of the wheel brake device 8c is also subjected to the control pressure in order to avoid an overload. The port of the pressure control module 82 is connected via the control line 40 to the control connection 38 of the shuttle valve device 20, the second connection 34 of which is connected to the spring-type brake actuators 12a, 12b, 12c, 12e, 12f to be released and the third connection 30 of which is connected via the relay valve 78 to the parking brake actuation device 16.

The parking brake actuation device 16 acts via the relay valve 78 on the spring-type brake actuator 12d of the forward rear axle 4 and via the shuttle valve device 20 on the spring-type brake actuators 12a, 12b of the front axle 2, the spring-type brake actuator 12c of the forward rear axle 4 and the spring-type brake actuators 12e, 12f of the trailing rear axle 6. The port of the pressure control module 82 serving as control pressure source is further connected to the service brake actuators 10c, 10e of the upper wheel brake devices 8c, 8e in FIG. 7, so that these are closed. The service brake 10d of the lower wheel brake device can be acted upon by the other port of the pressure control module 84.

The brake system 1 according to the present invention is not limited to the exemplary embodiments of a three-axle truck described, but may be used in a number of vehicles known in the state of the art. Furthermore the present invention is not limited to the release of the spring-type brake actuators of the front axle and the trailing rear axle. The release of one or any number of axles of a vehicle is possible by the brake system according to the exemplary embodiments and/or exemplary methods of the present invention.

A brake system for a vehicle, in particular for a utility vehicle, is disclosed, having at least one wheel brake device 8a-8f, which comprises a service brake actuator 10a-10f and a spring-type brake actuator 12a-12f, it being possible to actuate the wheel brake device 8a-8f by a service brake actuation device 14 and a parking brake actuation device 16. According to the exemplary embodiments and/or exemplary methods of the present invention at least the spring-type brake actuator 12a, 12b; 12e, 12f of a wheel brake device 8a, 8b; 8e, 8f can be released by a control pressure applied by the service brake actuation device 14 or another control pressure source 18, at least one further wheel brake device 8c, 8d being actuated in order to immobilize the vehicle. A vehicle having such a brake system is also disclosed.

The list of reference numerals is as follows:
1 brake system
2 front axle
4 rear axle
6 rear axle
8 wheel brake device
10 service brake actuator
12 spring-type brake actuator
14 service brake actuation device
16 parking brake actuation device
18 control pressure source
20 shuttle valve device
22 overload protection relay valve
24 control connection
26 connecting line
28 pressure line
30 first connection
32 supply line
34 second connection
36 line
38 control connection
40 control line
42 pressure line
44 relay valve
46 ABS valve
48 ABS valve
50 relay valve
52 footbrake pedal
54 connection
56 connection
58 connection
60 relay valve
62 overload protection relay valve
64 connection
66 connection
68 ASR valve
70 connection
72 connection
74 pressure control module
76 connecting line
78 relay valve
80 pressure control module
81 electronic control module (ECU)
82 pressure control module
84 pressure control module

The invention claimed is:

1. A brake system for a vehicle, comprising:
a service brake actuation device;
a parking brake actuation device of a parking brake system; and
at least two wheel brake devices, each including a service brake actuator and a spring-type brake actuator, wherein at least one of the wheel brake devices is actuatable on each of at least two axles by the service brake actuation device and the parking brake actuation device;
wherein the spring-type brake actuator of at least one of the wheel brake devices is releasable by a control pressure applied by control pressure source by way of a control line,
wherein at least one further wheel brake device for immobilizing the vehicle is actuated by at least one of (i) a spring force of the spring-type brake actuator assigned to this device, and (ii) a force of the service brake actuator,
wherein when the parking brake actuation device is engaged, the wheel brake devices on axles of the vehicle are releasable continuously or in stages, so as to prevent strain in the event of an air suspension ride height adjustment by a control unit without neutralizing the parking brake system, and
wherein release of the spring-type brake actuators is initiate-able by a signal from the control unit for the air suspension ride height adjustment, so that in operational service the spring-type brake actuators are available at any time as auxiliary, emergency or additional brakes.

2. The brake system of claim 1, wherein the control pressure source is an ASR valve.

3. The brake system of claim 2, wherein the ASR valve can be activated by an electronic control unit (ECU) for releasing the spring-type brake actuators.

4. The brake system of claim 3, wherein the pressure control module is connected to a control connection of a shuttle valve device, the second connection of which is connected directly or via a relay valve to the spring-type brake actuators to be released and the third connection of which is connected directly or via a relay valve to the parking brake actuation device for actuating the spring-type brake actuators.

5. The brake system of claim 3, wherein the pressure control module is arranged between the service brake actuation device and at least one ABS valve assigned to the service brake.

6. The brake system of claim 3, wherein the pressure applied by the pressure control module can be isolated by at least one ABS valve from the spring-type brake actuators to be released.

7. The brake system of claim 2, wherein the ASR valve is connected to a control connection of a further shuttle valve device, the second connection of which is connected to the service brake actuation device and the third connection of which is connected to an overload protection relay valve for releasing the spring-type brake actuators and directly or indirectly via a relay valve to at least one service brake actuator of at least one of the axles.

8. The brake system of claim 7, wherein the shuttle valve device is connected to the pressure control module of at least one axle, which is not to be released or which does not have any spring-type brake actuators.

9. The brake system of claim 1, wherein at least one pressure circuit of the service brake actuation device is the control pressure source.

10. The brake system of claim 9, wherein at least one of the pressures modulated by the service brake actuation device is restrained by at least one ABS valve of at least one assigned service brake actuator.

11. The brake system of claim 10, wherein at least one service brake actuator remains connected to the service brake actuation device, and wherein at least one service brake actuator prevents the vehicle from rolling away.

12. The brake system of claim 9, wherein the actuation of the service brake actuation device acts on at least one service actuator of at least one axle and at the same time serves as a control pressure source of at least one of the axles.

13. The brake system of claim 9, wherein at least one of the pressures modulated by the service brake actuation device is restrained by at least one ABS valve of all assigned service brake actuators, and wherein the vehicle is prevented from rolling away by at least one spring-type brake actuator.

14. The brake system of claim 1, wherein at least one spring-type brake actuator of at least one of the axles is releasable by a control pressure independently of the spring-type brake actuator of at least one further axle of the vehicle.

15. The brake system of claim 14, wherein the vehicle is prevented from rolling away by at least one unreleased spring-type brake actuator.

16. The brake system of claim 1, wherein a first connection of a shuttle valve device is coupled to the parking brake actuation device, a second connection is connected to the spring-type brake actuators to be released and a third connection is connected to the control pressure source, so that the spring-type brake actuators to be released can be subjected to a higher one of the two pressures from the control pressure source and the parking brake actuation device.

17. The brake system of claim 16, wherein the shuttle valve device can be brought by the pressure applied indirectly or directly via the ASR valve into a working position in which the spring-type brake actuators of at least one axle to be opened are released.

18. The brake system of claim 1, further comprising:
an overload protection relay valve, which has a connection connected to the service brake actuation device via a connecting line, a connection connected to the parking brake actuation device and a connection connected to the spring-type brake actuators.

19. The brake system of claim 18, wherein the control pressure for releasing the spring-type brake actuators of at least one axle is applied indirectly or directly through actuation of the service brake actuation device by the overload protection relay valve.

20. The brake system of claim 1, wherein the vehicle is prevented from rolling away by at least one service brake actuator.

21. The brake system of claim 1, wherein a wheel brake device that is not to be released is braked by the service brake actuator.

22. The brake system of claim 1, wherein the service brake actuation device is a footbrake valve.

23. The brake system of claim 1, wherein the service brake actuation device includes at least one pressure control module.

24. The brake system of claim 1, wherein the parking brake actuation device is a handbrake valve.

25. The brake system of claim 1, wherein a shuttle valve serves as shuttle valve device.

26. The brake system of claim 1, wherein an overload protection relay valve serves as shuttle valve device.

27. The brake system of claim 1, wherein the shuttle valve device can be brought by the pressure applied indirectly or directly via the service brake actuation device into a working position in which the spring-type brake actuators of at least one axle to be opened are released.

28. The brake system of claim 1, wherein the control pressure for releasing at least one spring-type brake actuator (12a, 12b; 12e, 12f) of at least one axle (2, 6) is applied by a pressure control module (74) of the electronic brake system (EBS).

29. A vehicle, comprising:
a brake system brake system, including:
  a service brake actuation device;
  a parking brake actuation device; and
  at least two wheel brake devices, each including a service brake actuator and a spring-type brake actuator, wherein at least one of the wheel brake devices is actuatable on each of at least two axles by the service brake actuation device and the parking brake actuation device;
wherein the spring-type brake actuator of at least one of the wheel brake devices is releasable by a control pressure applied by control pressure source by way of a control line,
wherein at least one further wheel brake device for immobilizing the vehicle is actuated by at least one of (i) a spring force of the spring-type brake actuator assigned to this device, and (ii) a force of the service brake actuator,
wherein when the parking brake actuation device is engaged, the wheel brake devices on axles of the vehicle are releasable continuously or in stages, so as to prevent strain in the event of an air suspension ride height adjustment b a control unit without neutralizing the parking brake system, and
wherein release of the spring-type brake actuators is initiate-able by a signal from the control unit for the air suspension ride height adjustment, so that in operational service the spring-type brake actuators are available at any time as auxiliary, emergency or additional brakes.

* * * * *